United States Patent
Lemmers, Jr. et al.

(10) Patent No.: US 7,855,487 B2
(45) Date of Patent: Dec. 21, 2010

(54) GENERATOR END TURN STRESS REDUCTION COLLAR

(75) Inventors: Glenn C. Lemmers, Jr., Loves Park, IL (US); Jan Henry Abels, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 180 days.

(21) Appl. No.: 12/328,866

(22) Filed: Dec. 5, 2008

(65) Prior Publication Data

US 2010/0141084 A1 Jun. 10, 2010

(51) Int. Cl.
*H02K 3/46* (2006.01)
(52) U.S. Cl. ...................................................... 310/270
(58) Field of Classification Search .................. 310/260, 310/270
See application file for complete search history.

(56) References Cited

U.S. PATENT DOCUMENTS

| | | | |
|---|---|---|---|
| 4,982,123 A | 1/1991 | Raad | |
| 5,081,382 A | 1/1992 | Collings | |
| 6,465,928 B1 | 10/2002 | Shervington | |
| 6,552,468 B2 * | 4/2003 | Lau et al. | 310/270 |
| 6,727,634 B2 | 4/2004 | Tornquist | |
| 6,838,778 B1 | 1/2005 | Kandil | |
| 6,849,987 B2 | 2/2005 | Tornquist | |
| 6,879,083 B2 * | 4/2005 | Doherty et al. | 310/270 |
| 7,262,537 B2 | 8/2007 | Worley | |

* cited by examiner

*Primary Examiner*—Dang D Lee
(74) *Attorney, Agent, or Firm*—Carlson, Gaskey & Olds

(57) ABSTRACT

A collar is to be positioned on a generator and includes an inner bore sized to be received on an outer periphery of a generator shaft. The collar has an outer periphery, which is generally hexagonal. The collar has an axially extending ledge to be received within an inner periphery of an end turn support in a generator.

12 Claims, 2 Drawing Sheets

GENERATOR END TURN STRESS REDUCTION COLLAR

BACKGROUND OF THE INVENTION

This application relates to a collar, which is incorporated into a generator to reduce stress on an end turn support.

Generators are known, and typically include a shaft that is driven to rotate by a source of rotation, such as a turbine engine. The shaft carries electrically energized coils that establish a magnetic field. The rotation of the coils within a stator generates electric current.

One component in a standard generator is an end turn support ring for supporting ends of the coils. The end turn support is subject to deflection during operation of the generator, as high speed components on the shaft rotate relative to it. Deflection can cause fatigue and possible failure.

SUMMARY OF THE INVENTION

A collar is to be positioned on a generator and includes an inner bore sized to be received on an outer periphery of a generator shaft. The collar has an outer periphery, which is generally hexagonal. The collar has an axially extending ledge to be received within an inner periphery of an end turn support in a generator.

In addition, the use of a collar in combination with an insulator is itself inventive.

These and other features of the present invention can be best understood from the following specification and drawings, the following of which is a brief description.

DETAILED DESCRIPTION OF THE PREFERRED EMBODIMENT

Figure 1:
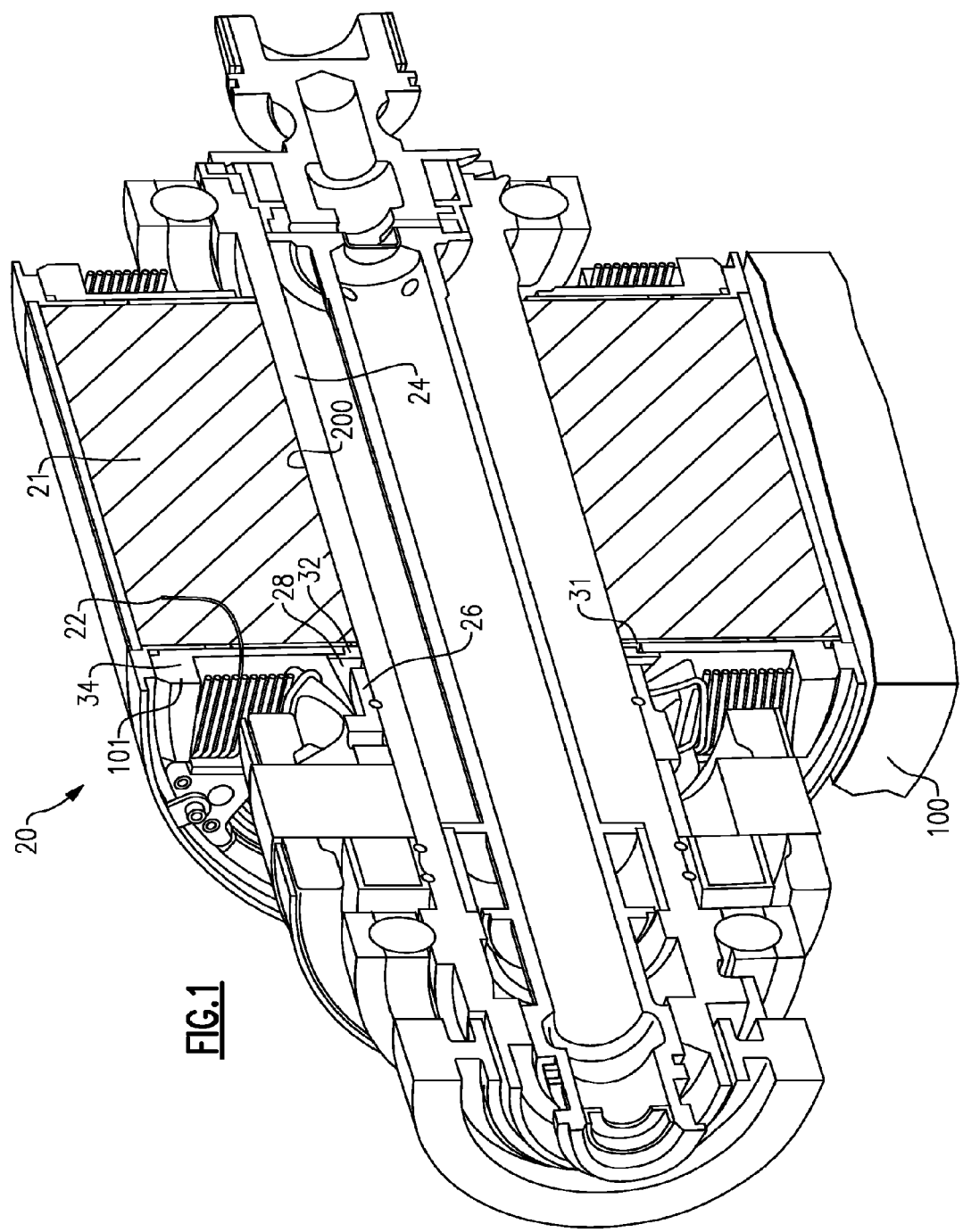
FIG. 1 is a cross-sectional view through a generator incorporating the present invention.

FIG. 1 shows a generator 20 incorporating a rotor 21 with coils 22 positioned radially outwardly of a rotating shaft 24. A stator 100 sits radially outwardly of the rotor 21, and is illustrated schematically. An insulator 26 and a collar 28 are mounted on an outer periphery of the shaft 24. In one embodiment, the two are force fit onto the outer periphery. However, other ways of attaching the elements to the shaft may be utilized. An end turn support 34 includes a central bore 31 into which an inner ledge 32 of the collar extends. The collar reduces deflection in the end turn support ring 34.

As is clearly shown in FIG. 1, the rotor 21 sits in contact with the shaft 24 as shown at 200. The inner ledge 32 of the collar does not extend beyond the end turn support ring 34, and does not extend as far as the rotor 21. Instead, the inner ledge ends within the axial extent of the end turn support ring 34. In addition, the end turn support ring 34 has an axially extending ledge 101 extending away from the rotor 21, and radially outwardly of the coils 22.

Figure 2:
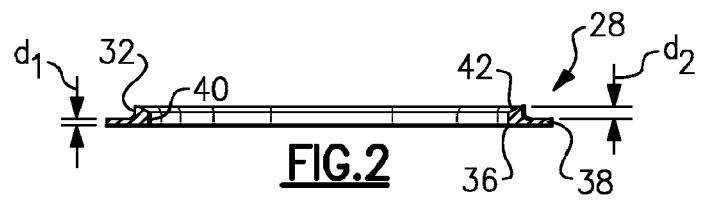
FIG. 2 is a cross-sectional view through the inventive collar.

The collar 28 is shown in FIG. 2 having radially outer portions 38, an inner bore 40, and the inner ledge 32. As shown, a chamfer 42 is formed at a radially inner portion 36 of the inner ledge 32. In one embodiment, this chamfer was formed at an angle of approximately 30°.

Figure 3:
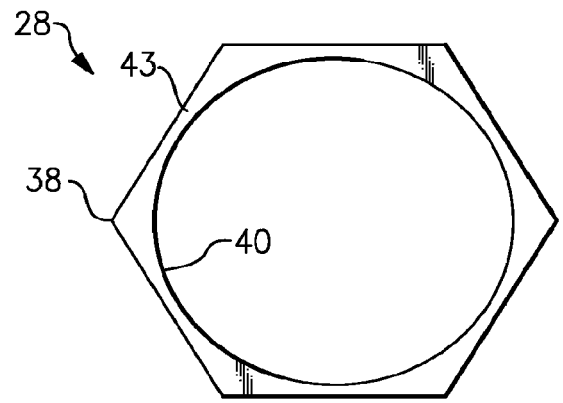
FIG. 3 is a front view of the inventive collar.

As shown in FIG. 3, several outer points 38 are connected by flat surfaces 43 such that the overall structure of the collar 28 is a hexagon.

In one embodiment, the distance d1 (see FIG. 2) was nominally 0.05" while the distance d2 was normally 0.10". It has been found that the collar provides most beneficial result if the ratio of d1 to d2 is between 0.2 and 0.8.

In the same embodiment, the inner bore 40 was at a radius of 2.56", while the radius of the outer periphery of the ledge 32 was 2.78". The radial distance to the outer points 38 has been found to be most beneficially 3.2". It has been found that the collar operates best when the radius of the inner bore to the radius to the outer points 38 is between 0.78 and 0.85.

Figure 4:
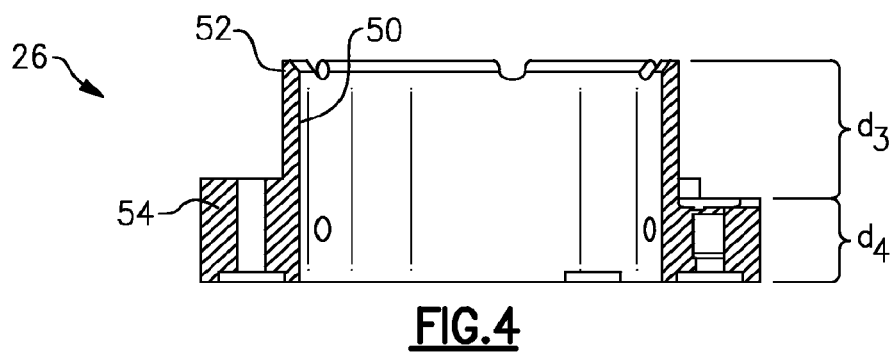
FIG. 4 is a cross-sectional view of a modified insulator.

FIG. 4 shows a modified insulator 26 having an enlarged portion 54 and an extension 52, with an inner bore 50, which is to be fit onto the outer periphery of the shaft. As shown, a distance d3 of the extension 52 is longer than a distance d4 of the enlarged portion 54. However, the distance d3 is shorter relative to the distance d4 than it has been in prior generators to provide axial space for the collar 28.

In one embodiment, the distance d4 was 0.67", while the distance d3 is 1.075". It has been found the system operates best when the ratio of these distances is between 0.6 and 0.65.

Figure 5:
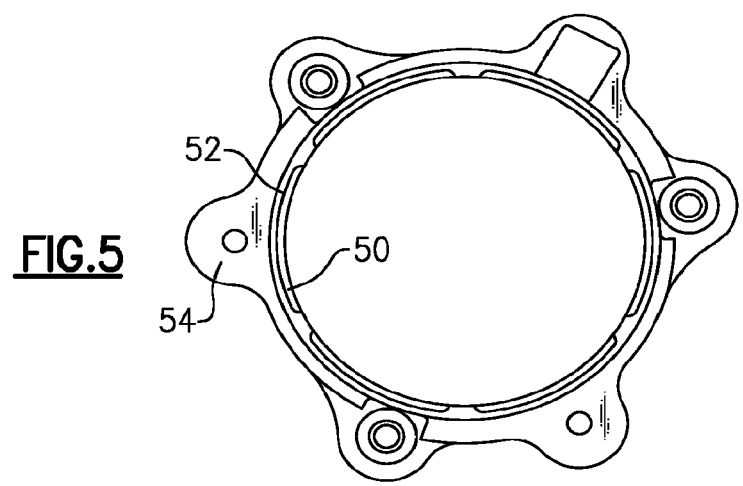
FIG. 5 is a front view of the insulator of FIG. 4.

FIG. 5 shows the outer periphery of the enlarged portion 54 having a plurality of spaced rings to receive bolts, etc.

With the present invention, the collar can be retrofit into existing generators and provide protection to the end turn supports.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A collar to be positioned on a generator, said collar comprising:

an inner bore sized to be received on an outer periphery of a generator shaft;

said collar having an outer periphery, which is generally hexagonal, and said collar having an axially extending ledge which is to be received within an inner periphery of an end turn support in a generator, said ledge being cylindrical, and of a smaller outer diameter than said hexagonal outer periphery;

a ratio of an axial length of said ledge to an axial length of said hexagonal outer periphery is between 0.2 and 0.8; and a ratio of a radius of said inner bore to a distance between a center of said inner bore measured to an outermost point of said hexagonal outer periphery is between 0.78 and 0.85.

2. The collar as set forth in claim 1, wherein said ledge has an inner peripheral bore with a chamfer at an end of said extension remote from said hexagonal outer periphery.

3. A generator comprising:

a plurality of coils, an end turn support for supporting axial ends and an inner periphery of said plurality of coils;

a rotating generator shaft for rotating with said plurality of coils;

a collar having an inner peripheral bore sized to be received on an outer periphery on said generator shaft, and an insulator spaced from said collar in a direction away from said plurality of coils, said collar having a ledge extending within an inner peripheral bore of said end turn support, and an enlarged outer face for facing an end of said end turn support; and said enlarged outer face being generally hexagonal, with said ledge being cylindrical and of a smaller outer diameter than said hexagonal enlarged outer face.

4. The generator as set forth in claim 3, wherein said ledge has an inner peripheral bore with a chamfer at an end of said extension remote from said hexagonal outer periphery.

5. The generator as set forth in claim 3, wherein a ratio of an axial length of said ledge to an axial length of said hexagonal outer periphery is between 0.2 and 0.8.

6. The generator as set forth in claim 5, wherein a ratio of a radius of said inner bore to a distance between a center of said inner bore measured to an outer point of said hexagonal outer periphery is between 0.78 and 0.85.

7. The generator as set forth in claim 3, wherein a ratio of a radius of said inner bore to a distance between a center of said inner bore measured to an outer point of said hexagonal outer periphery is between 0.78 and 0.85.

8. The generator as set forth in claim 3, wherein said ledge not extending beyond said inner peripheral bore of said end turn support but ending within said end turn support.

9. The generator as set forth in claim 8, wherein said rotating shaft includes a rotor and said rotor contacts said generator shaft.

10. An insulator and collar combination comprising:

a collar having an inner bore centered on an axis, and an outer periphery, which is generally hexagonal, and said collar having a cylindrical axially extending ledge which is to be received within an inner periphery of an end turn support in a generator;

an insulator to be associated with said collar on the shaft, said insulator having a radially enlarged portion and an extension portion to extend toward said collar;

a ratio of an axial dimension of said radially enlarged portion to said extension portion is between 0.6 and 0.65; and a ratio of an axial length of said ledge to an axial length of said hexagonal outer periphery is between 0.2 and 0.8.

11. The insulator and collar as set forth in claim 10, wherein said ledge has an inner peripheral bore with a chamfer at an end of said extension remote from said hexagonal outer periphery.

12. The insulator and collar as set forth in claim 10, wherein a ratio of a radius to said inner bore to a distance between a center of said inner bore measured to an outermost point of the hexagonal outer periphery is between 0.78 and 0.85.

* * * * *